Patented May 3, 1938

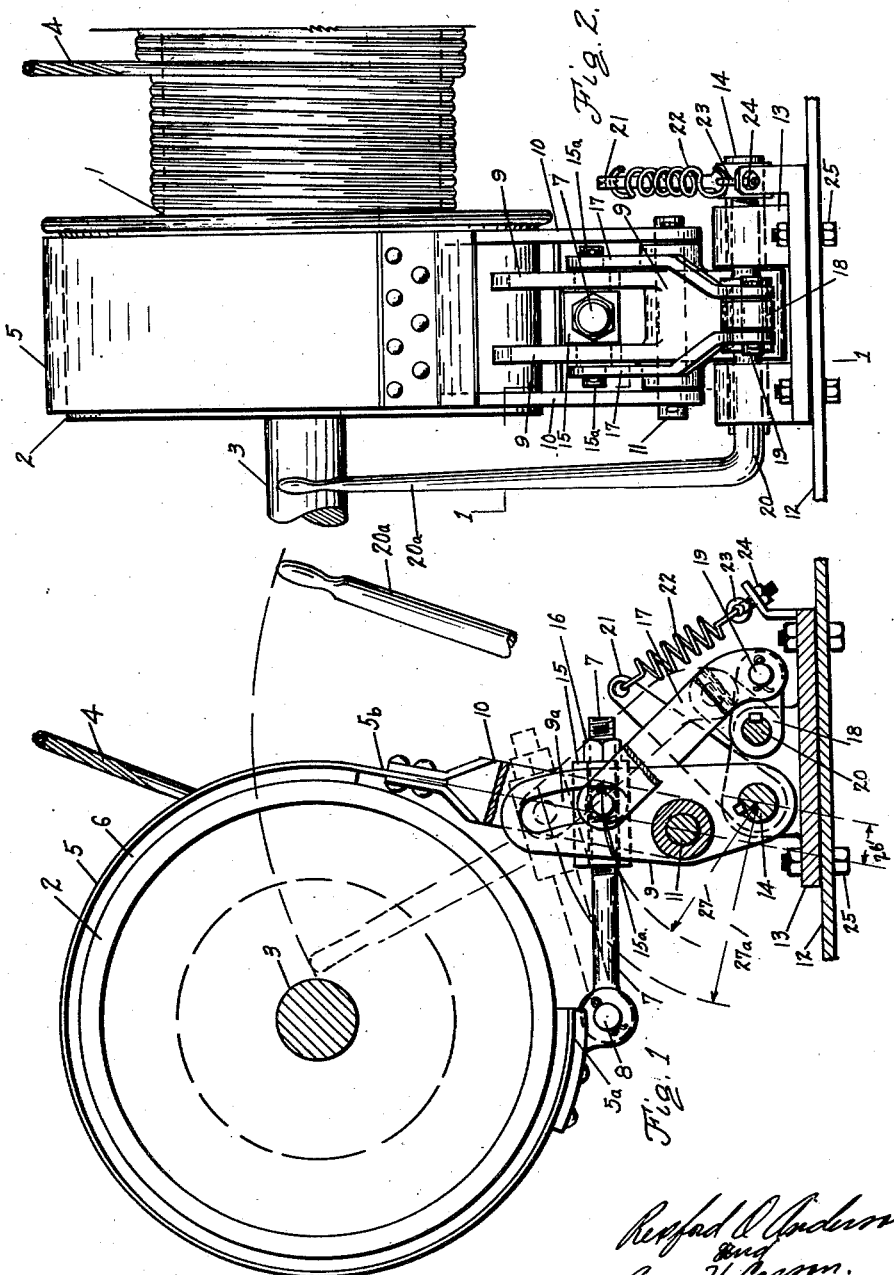

2,116,013

UNITED STATES PATENT OFFICE 2,116,013

BRAKE OPERATING MECHANISM

Amon H. Carson and Rexford O. Anderson, Oklahoma City, Okla.

Application February 24, 1936, Serial No. 65,290

14 Claims. (Cl. 188—77)

This invention relates to new and useful improvements in brake operating mechanism.

An object of the invention is to afford an easily operated mechanism for operating the friction type of brake ordinarily used on brake drums of hoisting equipment, such as cranes, oil well drawworks equipment, and excavating equipment, where it is necessary to hold and lower heavy loads by controlling the pressure applied to the braking surfaces.

A further object of the invention is to afford a brake mechanism in which the tension administered to control the work of the braking surface is furnished by the load to be handled.

A further object of the invention is to afford a brake mechanism in which the normal adjustment of the brake mechanism causes the brake to be locked automatically with the introduction of the load upon it.

A further object of the invention is to allow the brake mechanism to automatically release its pressure on the braking surfaces when the load is lifted by the source of power without the necessity of manual operation of its parts.

A further object of the invention is to afford a brake mechanism in which the degree of braking power is administered by manual adjustment without having to manually operate against the load to be handled.

The conventional brake mechanism, especially in use on oil well drilling equipment, consists of a brake band lined with material of high coefficient of friction which is wrapped part way about a brake drum. The power necessary to operate the brake in order to hold the loads is administered by the operator through a brake lever, to the snub end of the brake band in the direction of rotation. In the operation of this equipment, the effort necessary to create the frictional resistance necessary to hold the load, has to be administered by the operator in the form of a pull on the end of the brake lever. This not only requires great effort on the part of the operator, but also limits the extent of the work possible to the effort the operator can exert. In some cases his capacity is insufficient to do the work necessary and results in the load getting beyond his control, with consequent injury to the operator and equipment. In instances of extreme loads to be handled, this requires the use of massive equipment in the way of brake drums, brake bands, and levers.

This invention operates on the principle of power ratios created by the angle of wrap of the brake band around the brake drum, and the coefficient of friction of the materials used on the braking surfaces, working in conjunction with the ratio of leverages of the two ends of the brake band, about the point of anchorage of the mechanism. It utilizes the ultimate power on the anchor end of the brake band to furnish the operating power on the snub end, necessary to furnish the first mentioned power, by proportioning the power ratio through the angle of wrap with the leverage ratio of the anchored end to the snub end; i. e., by making the two ratios equal, the mechanism automatically locks and holds the load, and by unbalancing them in favor of the leverage ratio, the load is allowed to be released. The function of the operator is to merely control the relation of the two ratios by varying the leverage ratio.

With the above and other objects in view, the invention has particular relation to certain novel features of construction, operation, and arrangement of parts, an example of which is given in this specification and illustrated in the accompanying drawing, wherein:

Fig. 1 shows an end elevation and part section of the mechanism on the line 1—1 of Figure 2, as attached to a hoist drum.

Fig. 2 shows a front elevation of the mechanism as attached to a hoist drum.

Referring now more particularly to the drawing, wherein like numerals of reference designate similar parts in each of the figures, the numeral 1 designates a hoisting drum having the braking drum surface 2, and mounted on the shaft 3, which supports it in the conventional bearings, not shown, for rotation. About the drum 1, is wrapped the flexible cable 4 from the end of which is suspended the load to be handled. Wrapped about the braking drum surface 2, is the brake band 5, which is lined with a frictional material 6. The snub end 5a of the brake band 5 is fitted with the eye bolt 7, being attached to it by the pin 8. The anchor end 5b, of the brake band 5, is attached to the main link 9 by means of the links 10, and the pin 11. The main link 9, is attached to the floor 12, by means of the bearing 13, and the bolts 25, and pivots therein on the shaft 14 to which it is keyed. The link 9 has also in its other end, which is shown as being forked, the slots 9a, arranged to receive and confine laterally the crosshead 15, which is also confined laterally by the link forks, thus allowing the crosshead 15 to move longitudinally with respect to the link 9. The crosshead 15 is bored to receive the eye bolt 7, and is attached to the eye bolt by means of the nut 16. In this manner the two ends of the brake band are connected to the link 9 and the floor 12. The crosshead 15 has the trunnion extensions 15a on both sides, and on which are pivoted one end of the two operating links 17, the other ends being attached to the bell crank 18 by means of the pin 19. The bell crank is keyed to the lever shaft 20, which also rotates in a bore in the bearing 13, and has formed on one end, the lever 20a. The main link shaft 14 has also keyed to it the lever arm 21, which is attached to the bearing 13 and the floor 12 by means of the tension spring 22, the eye bolt 23, and the nut 24.

In operation, the braking mechanism is adjusted as illustrated in the drawing. The nut 16 being tightened so that with the spring 22 being in tension, the main link 9 is so positioned that the line of pull of the brake band anchor end 5b through the pin 11, has established the leverage 26' with respect to the shaft 14 which will remain constant during said adjustment. In this position, with the brake lever 20a as shown in full lines, the snubbing end of the brake band 5a has its line of pull, through the eye bolt 7 and the crosshead 15, at a leverage 27 with respect to the shaft 14. The ratio of these two leverages 26' and 27, create the leverage ratio which is variable by the movement of the brake lever 20a with the consequent movement of the crosshead 15 with respect to the shaft 14, which varies the leverage 27.

The wrap ratio of power of the brake band varies as the angle of wrap about the brake drum surface and the coefficient of friction. For example, we will say the angle of wrap is 270 degrees, and the coefficient of friction is such as to allow a wrap ratio of 4 to 1, i. e.; with 1 pound pull on the snub end 5a, we would have a pull on the anchor end 5b, of 4 pounds. This gives a net resistance to rotation of the brake drum surface of 4 less 1, or 3 pounds. This wrap ratio is constant due to the sizes and permanent installation.

To set the mechanism so, that at the position shown in full lines, the mechanism will automatically lock and hold the load, the nut 16 is set so that the leverage 27 is to the leverage 26' as 4 or less is to 1, say 3 to 1. Assume that the load to be held on the brake drum surface is 9,000 pounds. The pull administered to the brake band end 5a by the spring 22 is, say 100 pounds. As soon as the load of 9,000 pounds starts to rotate the drum counterclockwise, the wrap ratio of 4 to 1, multiplies the spring load on 5a of 100 pounds to 400 pounds on 5b, which through the leverage ratio of 3 to 1 raises the pull on 5a to 133 pounds, which the wrap ratio again increases the pull on 5b up to 532 pounds, and so on until the brake surface load of 9,000 pounds is transmitted to the brake band end 5b, which through the leverage ratio administers a pull of 3,000 pounds to 5a, and the wrap ratio increases pull on 5b to 4×3,000 or 12,000 pounds pull. Thus the net resistance to the load on the brake drum surface equals 12,000—3,000 or 9,000 pounds, thus balancing the 9,000 pound load and holding the drum stationary. It is now desired to release the brake band resistance sufficient to lower the load. To do this the brake lever 20a is moved to the left, as shown in broken lines, thus raising the cross-head 15, as shown in broken lines, making the leverage 27 to increase to 27a. This we will say raises the leverage ratio to above that of the wrap ratio of 4 to 1, say for example, of 5 to 1.

The brake band end 5b load of 12,000 pounds transmits a pull, through the leverage ratio of 5 to 1, of 2,400 pounds to brake band end 5a, the wrap ratio then transmits a load of 4×2,400 or 9,600 pounds to the brake band end 5b, thus giving a net resistance of 9,600—2,400 or 7,200 pounds, which is overbalanced by the load of 9,000 pounds to be held on the brake drum surface, allowing the load to be lowered.

To again stop the load it would be necessary for the operator to move the lever 20a back to the former position, changing the leverage ratio of, say back to 3 to 1, and building up the load of 3,000 pounds on 5a and 12,000 pounds on 5b, to balance the load of 9,000 pounds on the brake drum surface. To perform this operation, the work necessary for the operator to perform was to overcome the sliding friction of the crosshead in the link, due to the pull of the brake band end 5a, which with a coefficient of friction of 3%, would amount to 90 pounds, instead of overcoming 3,000 pounds as in the conventional brake mechanism.

When the drum is rotated in a clockwise direction to lift the load the brake band end 5a tends to rotate with the drum due to the tension of spring 22, and causes the link 9 to pivot to the left for a number of, say 5 degrees. In doing so the crosshead 15 travels to the left a distance in proportion to the leverage 27, tending to lengthen the brake band that extent, say 1 inch. Simultaneously the pivot pin 11 moves to the left in extent proportion to its leverage 26 say ¼ inch and tends to shorten the brake band to that extent. The net movement of the two results in lengthening the brake band 1 less ¼ or ¾", which would make the brake band to stand out from the surface of the drum a distance of ¾ inch divided by 3.1416 or approximately ¼ inch in diameter. This would then release the brake drum from all resistance from the brake band, excepting the tension of the spring 22, and allow the drum to automatically rotate freely. When the drum is again brought to a stop and the load is applied to rotate it in a counterclockwise direction, the spring tension on the lever 21 pivots the link 9 again to the right, and transfers its tension to the brake band end 5a and as above described builds up the load on the brake band end 5b in proportion to the leverage and wrap ratios to automatically retard the rotation of the drum.

It is obvious that the invention is subject to mechanical variations and while the drawing and description disclose what we now consider to be preferred forms and adaptations of the invention, it is to be understood that they are illustrative only, and that the broad principle of the invention will be defined by the appended claims.

What we claim is:

1. A brake mechanism including a brake band, having its two ends connected at points which vary relative to each other on a single link, which is in turn attached to a foundation, whereby the power, as built up by the load being handled, is transmitted to create the power necessary to balance the load.

2. A brake mechanism including a brake band, a single link attached to a foundation and to which the ends of the band are connected, whereby the action of rotation opposite to that created by a load, will tend to lengthen the brake band mechanism about the drum, allowing the drum to be rotated freely and yieldable means whereby said link may be adjusted.

3. A brake mechanism including a brake band, means to which the two ends of the band are connected at points which vary relative to each other so as to allow the braking resistance of the band to be controlled through the variation of leverages of the lines of pull of its two ends about a point of anchorage of the mechanism and means for manually effecting such variation.

4. A brake mechanism comprising a rotatable brake drum, load handling means having connection with the drum, a brake band arranged to frictionally engage the drum, a common link, one end of which is pivoted directly to a stationary anchor, the ends of the band being connected to the link at points variably spaced from the pivot of the link so that the power of the load will be transmitted to the band to effect the setting of the brake to balance the load.

5. A brake mechanism comprising a brake drum and apparatus operatively connected therewith for lifting and lowering a load, a brake band arranged to frictionally engage and release the drum, a common link pivotally connected, at one end, directly to an anchor, means for connecting the ends of the band to the link at points which are relatively variable from the pivot of the link so that the rotation of the drum to effect elevation of the load will also effect release of the band from the drum.

6. A brake mechanism comprising a brake drum, a brake band arranged for frictional engagement with the drum, an anchor, a shiftable member connected to the anchor and to which one end of the band is connected, a connecting means on the shiftable member to which the other end of the band is connected, said connecting means being movable to vary its distance from connection of the shiftable member with the anchor.

7. A brake mechanism comprising a brake drum, a brake band arranged for frictional engagement with the drum, an anchor, a shiftable member connected to the anchor and to which one end of the band is connected, a connecting means on the shiftable member to which the other end of the band is connected, said connecting means being movable to vary its distance from connection of the shiftable member with the anchor and manual means for moving the connecting means.

8. A brake mechanism comprising a brake drum, a brake band arranged for frictional engagement with the drum, a pivotably mounted link to which one end of the band is connected, a cross-head adjustable on the link for movement to vary its distance from the pivotable connection of the link, means for adjustably connecting the other end of the band with the cross-head and means for shifting the cross-head on the link.

9. A brake mechanism including a brake drum, a brake band mounted for frictional resistance on said drum, both ends of said band being attached at relatively variable points to a single link, said brake band and link being so arranged as to automatically resist the rotation of the drum in one direction, means for manually varying the relative points of the band connections to said link to control the resistance to the drum's rotation in one direction.

10. A brake mechanism including a brake drum, a brake band mounted for frictional resistance on said drum, both ends of said band being attached at relatively variable points to a single link, said brake band and link being so arranged as to automatically resist the rotation of the drum in one direction, and automatically release the drum for rotation in the opposite direction, means for manually varying the relative points of the band connections to said link to control the resistance to the drum's rotation in said direction.

11. A brake mechanism comprising a brake drum, a brake band arranged for frictional engagement with the drum, an anchor, a shiftable member connected to the anchor and to which both ends of the band are connected, one of said ends having a length adjusting means.

12. In a braking mechanism comprising a brake drum, a brake band for frictional resistance thereon, an anchor, a shiftable link pivotally mounted to said anchor to which one end of the said brake band is pivotally attached, and to which the other end of the brake band is adjustably attached, means for normally shifting the said link for causing normal contact of the band with said drum, the above elements being arranged to cause automatic braking resistance to the rotation of said drum in one direction, the controlling force on the brake band being induced by the working force induced by the drum rotating load, said resistance being in proportion to the leverage ratios of the lines of force of the work end and the control end of said brake band, and the control-work force ratio of the braking surface, means for varying said leverage ratio for controlling said braking resistance, said arrangement of elements being such as to automatically cause negligible resistance to rotation of said drum in the opposite direction.

13. A brake mechanism including a brake band, a single link, means connecting the ends of said band to said link, and said link being pivotally connected at one end directly to an anchor, yieldable means for adjusting the leverages of the band connections with the link pivot whereby the power built up by the load on one band end is transmitted to the other band end to control the movement of said load.

14. A brake mechanism including a brake band, a single link means connecting the ends of said band, and one end pivotally connected directly to an anchor, yieldable means for adjusting the leverages of the band connections with the link pivot whereby the rotation of the braking surface opposite to that exerted by a load will tend to lengthen the brake band about the braking surface.

AMON H. CARSON.
REXFORD O. ANDERSON.